United States Patent [19]

Baker et al.

[11] 4,051,875

[45] Oct. 4, 1977

[54] CONDUCTOR WRAPPING BIT

[75] Inventors: William J. Baker; Clifford L. Galloup, both of Reed City, Mich.

[73] Assignee: Gardner-Denver Company, Dallas, Tex.

[21] Appl. No.: 763,948

[22] Filed: Jan. 31, 1977

[51] Int. Cl.[2] .......................... B21F 15/00; B25F 1/00; H02G 1/12

[52] U.S. Cl. ..................................... 140/124; 242/7.17

[58] Field of Search ...................... 7/14.1 R; 81/9.5 R; 140/119, 124; 242/7.06, 7.17, 7.18

[56] References Cited

U.S. PATENT DOCUMENTS

| | | | |
|---|---|---|---|
| 2,746,124 | 5/1956 | Belek | 242/7.17 X |
| 2,836,837 | 6/1958 | Belek | 7/14.1 |
| 2,863,610 | 12/1958 | Chambers et al. | 242/7.17 |
| 2,926,859 | 3/1960 | Bos et al. | 242/7.17 |
| 3,625,262 | 12/1971 | Baker et al. | 140/124 |
| 3,701,367 | 10/1972 | Ackerman | 140/119 |
| 3,882,906 | 5/1975 | Steiner et al. | 140/124 |
| 3,967,661 | 7/1976 | Scoville et al. | 140/124 |

*Primary Examiner*—E. M. Combs

*Attorney, Agent, or Firm*—Michael E. Martin

[57] ABSTRACT

A wrapping bit for insulated conductor wire includes a transverse end face having a shelf projecting from the surface of the end face adjacent the longitudinal wire receiving groove. An insulation slitting knife edge is formed on the shelf and extends along the surface of the shelf in a direction transverse to the longitudinal axis of the wrapping bit. A conductor guide channel intersects the wire receiving groove for guiding the insulated conductor onto the shelf and over the knife edge for slitting the conductor insulation longitudinally and just prior to wrapping the wire onto a terminal.

8 Claims, 8 Drawing Figures

CONDUCTOR WRAPPING BIT

BACKGROUND OF THE INVENTION

In conventional processes for making solderless wrapped connections with flexible insulated conductor wire it is customary to use conductor wire which has the insulation entirely removed from the end of the conductor to expose a portion of bare wire which is to be wrapped on a terminal post. Accordingly, the conductor must be prepared for the wrapping operation prior to insertion in the wrapping bit, or tools must be used which cut and strip the insulation prior to coiling the wire on the terminal. Some tools of the type last mentioned have been known to be difficult to operate satisfactorily, and they present the problem of disposal of the pieces of stripped insulation. Furthermore, the bare conductor wire portion which is coiled about the terminal is subject to the danger of short circuits due to unwanted contact with adjacent terminals or other conductors. Moreover, in conductor wrapping processes whereby a series of spaced apart terminals are interconnected by a continuous length of conductor it has previously been impractical to provide insulation on the conductor between each terminal.

U.S. Pat. No. 2,746,124 to E. Belek discloses a conductor wrapping bit which includes means for continuously removing a portion of the insulation from the conductor prior to wrapping the conductor on a terminal. U.S. Pat. No. 3,967,661 to R.R. Scoville et al. discloses a conductor wrapping bit which is designed to cut a longitudinal slit in the conductor insulation cover to expose the conductor portion which is to be brought into contact with the terminal post during the coiling or wrapping process.

SUMMARY OF THE INVENTION

The present invention provides for a wrapping bit for insulated conductor wire which includes means for cutting a longitudinal slit in the conductor insulation whereby the conductor is exposed only to the extent necessary to form suitable contact with the terminal post upon which the conductor is being wrapped. With the wrapping bit of the present invention solderless wrapped electrical connections can be made without removing the insulation from the conductor.

The present invention also provides for a conductor wrapping bit having means for making a continuous longitudinal slit in the conductor insulation during the wrapping process and whereby the slit is formed in the insulation immediately before the conductor is brought into contact with the terminal. Accordingly, with the wrapping bit of the present invention there is no need to rely on or provide for twisting or turning of the conductor wire about its longitudinal axis in order to bring the bare conductor into contact with the terminal.

The present invention contemplates an insulation slitting and conductor wrapping bit which provides for cutting a longitudinal slit in the conductor insulation without gouging or nicking the conductor wire itself. Moreover, the conductor wrapping bit of the present invention minimizes the risk of jamming the conductor between the insulation cutter and another portion of the bit proper.

The present invention further provides an insulation slitting and conductor wrapping bit wherein the location of the insulation slitting edge is not within nor in direct communication with the conductor receiving or guide channel in the bit. Accordingly, the insulated conductor may be inserted in and withdrawn from the conductor receiving channel with ease and without unwanted slitting of the insulation.

The conductor wrapping bit of the present invention still further provides for improved conductor guide surfaces to assure suitable guidance of the insulated conductor as it is withdrawn from a longitudinal receiving channel and over the insulation cutting edge.

The above noted features and advantages of the present invention as well as others will be further appreciated upon reading the description of the preferred embodiment together with the accompanying drawings.

DESCRIPTION OF THE PREFERRED EMBODIMENT

Figure 1:
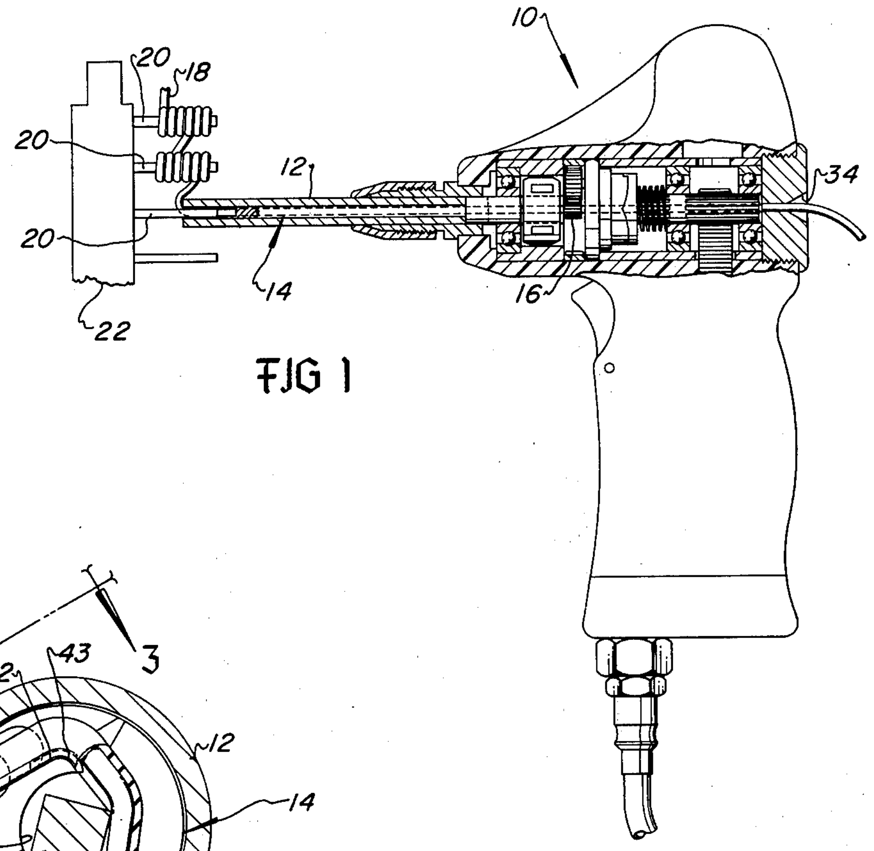
FIG. 1 is a side elevation, partly sectioned, of a conductor wrapping tool including the wrapping bit of the present invention.

Referring to FIG. 1 there is illustrated a conductor wrapping tool generally designated by the numeral 10. The tool 10 is adapted to support an elongated stationary tubular sleeve 12 in which is rotatably disposed a conductor wrapping bit generally designated by the numeral 14. The tool 10 includes suitable mechanism, including the driven spindle 16 for rotatably driving the bit 14 to form a series of solderless wrapped interconnections between a flexible insulated conductor 18 and spaced apart terminal posts 20. The terminals 20 are adapted to be mounted on a supporting structure 22 in a well known way. The tool 10 is generally like that which is disclosed in U.S. Pat. No. 3,284,011 which is assigned to the assignee of the present invention. A detailed description of the tool 10 will be omitted here in the interest of conciseness. The tool 10 is adapted to be used in combination with the conductor wrapping bit of the present invention to perform solderless interconnecting operations with a continuous length of conductor, a process sometimes referred to as "strapping."

Figure 4:
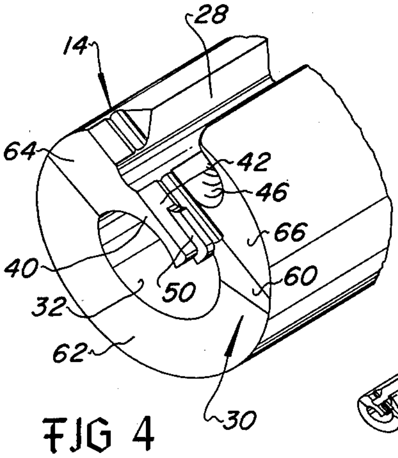
FIG. 4 is a perspective view of the bit end face.
Figure 5:
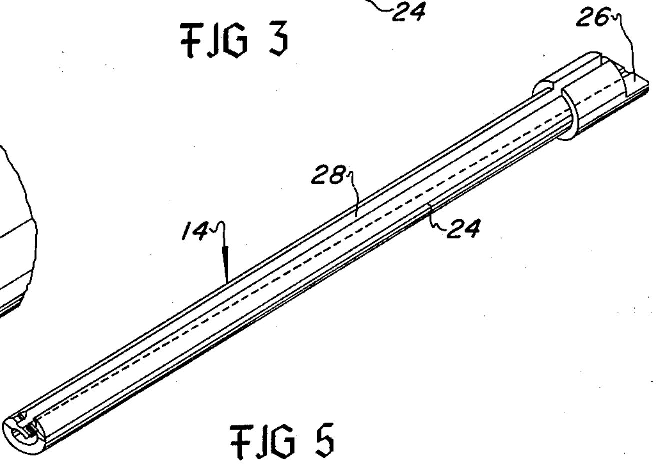
FIG. 5 is a perspective view of the wrapping bit of the present invention.

Referring to FIG. 5 also, the wrapping bit 14 is characterized by an elongated cylindrical shaft 24 having a transverse flat 26 formed on one end for driving engagement with the spindle 16. The bit 14 also includes a longitudinal groove 28 which opens to the circumference of the bit shaft 24. As shown also in FIG. 4 the groove opens to a transverse end face generally designated by the numeral 30. The groove 28 is disposed radially, offset with respect to the axis of rotation of the bit, for approximately one third of the bit length. The groove 28 then slopes radially inwardly, with respect to the axis of rotation of the bit 14, to the flat 26 so that the conductor is received in the groove substantially coaxial with the bit rotation axis. As shown in FIG. 1 the tool 10 is adapted to have the conductor 18 threaded through an opening 34 and through suitable passage means in the tool mechanism to the conductor receiving groove 28. The bit 14 is also provided with a longitudinal bore 32 which opens to the end face 30 and which receives a terminal therein for the conductor wrapping process.

Figure 2:
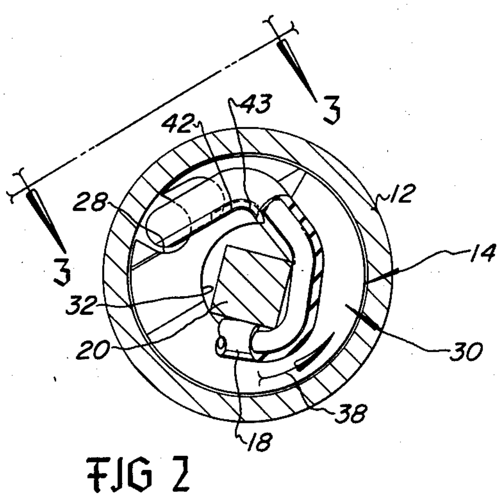
FIG. 2 is a transverse end view showing the bit end face during the process of slitting the insulation and wrapping the conductor on a terminal.

Prior to a wrapping operation the conductor 18 is pulled from the groove 28 at the end face 30 and the conductor end portion is held stationary while the bit is placed over a terminal 20 in a known way and is then rotated anticlockwise in the direction of the arrow 38 in FIG. 2 to form a series of helical convolutions of the conductor on the terminal. The tool is then removed from the terminal and moved to the next terminal to be wrapped. The conductor is pulled substantially straight through the groove 28 as the tool is moved from one terminal to the next in performing the strapping operation.

The conductor wrapping bit 14 is provided with novel means for making a longitudinal cut or slit in the insulation cover so that an insulated conductor wire may be wrapped on a terminal and yet a suitable portion of the metal conductor wire may be brought into electrically conductive engagement with the terminal, as shown in FIG. 2. The configuration of the bit portion which performs the insulation cutting and conductor guiding functions is illustrated in detail in FIGS. 6, 7, and 8.

Figure 6:
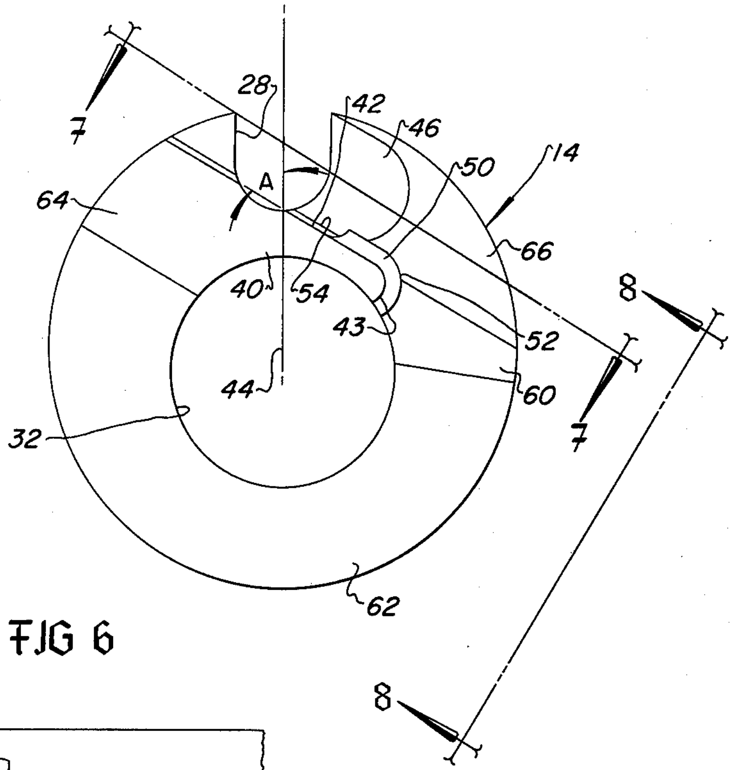
FIG. 6 is a transverse end view of the bit end face.
Figure 7:
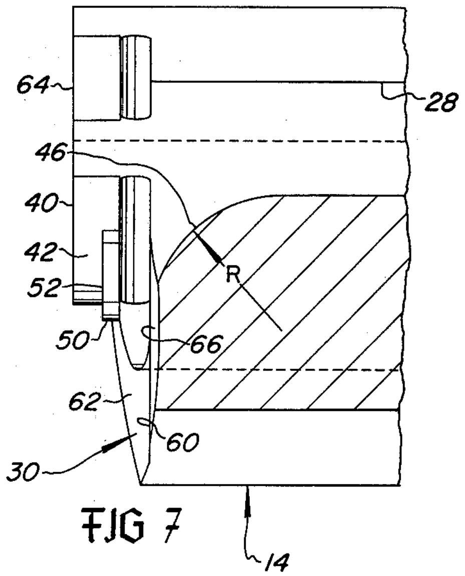
FIG. 7 is a section view taken along the line 7—7 of FIG. 6.

The bit 14 is provided with a shelf 40 which is formed on the end face 30 and includes a conductor guide and supporting surface 42 which is adjacent to the bottom of the conductor receiving groove 28. The groove 28, which has a circular cross section bottom, intersects the surface 42 as shown in FIGS. 4 and 6. As shown in FIG. 6 a major portion of the surface 42 is formed to lie in a plane which intersects a plane passing through the longitudinal center axis 44 of the bit, which is also the axis of rotation, and bisects the groove 28, thereby also passing through the radial innermost point of the groove 28 with respect to the longitudinal axis of the bit. The angle of intersection A of the surface 42 with the last mentioned plane is, in a preferred form of the bit 14, approximately sixty degrees. The bit 14 is also provided with a curved conductor guide channel 46 which intersects the groove 28 and the end face 30. The guide channel 46 has a contour which is circular in transverse section and, as shown in FIG. 7, follows a curved path of circular radius R. The circular arc cross section of the guide channel 46 is symmetrical with respect to a plane parallel to the longitudinal axis 44 of the bit and parallel to the surface 42. The line 7—7 would lie in such a plane.

The conductor wrapping bit 14 is further characterized by an insulation slitting blade formed as a projection 50 which is substantially perpendicular to the surface 42. The projection 50 extends to the lateral edge of the shelf and follows a curved surface 43 forming the edge of the shelf which is actually a continuation of the surface 42.

Figure 8:
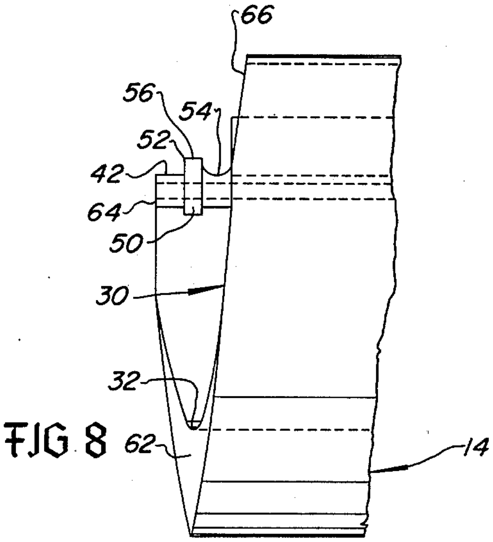
FIG. 8 is a side elevation view taken substantially from the line 8—8 in FIG. 6.

Viewing FIGS. 7 and 8 in particular, the projection 50 includes a sharp edge 52 which performs the cutting or slitting action on the insulation of a conductor wire as it is drawn out of the groove 28 during the wrapping process. The edge 52 is arranged to extend substantially transversely with respect to the longitudinal axis 44 and, preferably, the edge 52 lies in its entirety in a plane perpendicular to the axis 44. As may be noted also from viewing FIGS. 7 and 8 a step 54 is formed between the projection 50 and the end face 30 so that in effect the top surface 56 of the projection 50 is farther from the surface 42 than the step 54. The step 54 may be flat or formed to have a concave curved surface. Viewing FIG. 8, the linear distance from the surface 42 to the top surface 56 of the projection 50 is in a preferred embodiment, approximately twice the distance from the step 54 to the top surface 56. The distance from the surface 42 to the surface 56 is also preferably substantially the same as the thickness of the insulation cover of the conductor.

The end face 30 of the bit 14 comprises a first surface 60 which is substantially perpendicular to the longitudinal axis 44 of the bit and is contiguous with a second surface 62 which forms a helix with respect to the longitudinal axis of the bit and slopes away from the surface 60. The surface 62 forms a so-called "left-hand helix," that is the surface advances away from the viewer of a transverse end view, such as the view of FIG. 6, if a point is moved along the surface in a counterclockwise or "left-hand direction." The helical advance of the surface 62 in axial direction conforms substantially to the natural helical advance of the insulated conductor as it is wrapped on a terminal. In a preferred form of the conductor wrapping bit of the present invention the helical surface 62 begins at the intersection with the surface 60 which is on a radial line from the longitudinal axis 44 of the bit and located approximately ninety-eight degrees from a line through the axis 44 and bisecting the conductor receiving groove 28. The helical surface 62 should terminate before encountering the edge of the surface 42. Accordingly, a third surface 64 which lies in a plane substantially perpendicular to the axis 44 may be formed as relief to prevent the edge of the surface 42 from wiping across the conductor wire already coiled onto the terminal.

Figure 3:
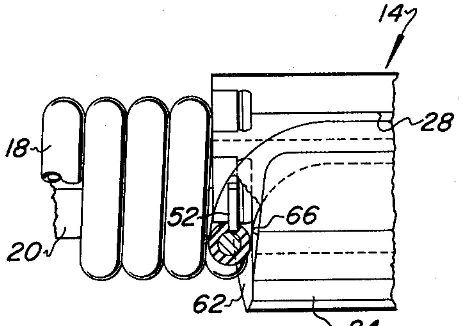
FIG. 3 is a view taken from the line 3—3 of FIG. 2; ;p

The end face 30 further includes a substantially flat surface 66 which slopes away from the surface 60, as shown in FIG. 8, and lies in a plane which intersects the plane of the surface 60 at an angle of about eight degrees, thirty minutes. The surface 66 cooperates with the guide channel 46 and the step 54 to guide the insulated conductor onto the projection 50 so that the edge 52 cuts through the conductor insulation approximately along a radial line with respect to the central longitudinal axis of the conductor as shown in FIG. 3. Therefore, as shown in FIG. 2, as the conductor is drawn out of the groove 28 and through the channel 46 the insulation will be slit along the side of the conductor which is to be brought directly into contact with a terminal as the conductor passes around and off the curved edge 43 of the shelf 40. The conductor wrapping bit 14 may be operated in conjuction with the tool 10 by threading the insulated conductor 18 through the opening in the back of the tool housing and through the groove 28 until a short end portion of the conductor extends beyond the end face of the bit sufficiently to be grasped by the tool operator and held stationary while the conductor is coiled on the first terminal. Prior to actuation of the tool to rotate the bit 14 the conductor 18 is initially drawn substantially longitudinally out of the groove 28 and then pulled transversely into the guide channel 46, although it is not absolutely necessary that the conductor be placed in the guide channel before rotation of the bit is commenced. While the conductor end is held stationary, the bit is moved into position over a terminal 20 with the terminal projecting into the bore 32. As rotation of the bit is commenced, the conductor is drawn over the edge 52 which cuts into the insulation. Continued rotation of the bit 14 causes the conductor 18 to move through the groove 28 and the guide channel 46, onto the surface 42, and around the curved end of the surface and off the shelf directly toward the terminal. The edge 52 will continuously slice through the insulation cover of the conductor to form a longitudinal slit. As the conductor 18 leaves the curved end surface 43 of the shelf 40 no further rolling or rotation occurs about the longitudinal axis of the conductor and, accordingly, the slit in the insulation remains between the conductor wire and the terminal 20 to assure that as the conductor is drawn onto the terminal that the insulation will be spread laterally to allow the conductor wire to come into contact with the terminal. As the bit 14 rotates the helical surface 62 urges the conductor to remain in a helical convolution and also causes the bit to move rearwardly away from the terminal against a suitable biasing force which may be provided by a device similar to that which is disclosed in U.S. Pat. No. 3,098,615.

When the desired number of turns of conductor have been wrapped on the terminal the rotation of the bit is ceased, with respect to the tool 10, normally in the position of the bit shown in FIG. 6. The at rest position of the bit 14 as well as the number of turns of the conductor may be automatically controlled by the tool 10. The tool 10 is then withdrawn from the terminal which has been wrapped and moved to the next terminal. As the tool is withdrawn and moved the conductor tends to move directly out of the groove 28 in an axial direction and not over the edge 52. Accordingly, cutting of the insulation ceases as the conductor is led to the next terminal and is not resumed until the tool is place over another terminal. Even if the conductor is not trained into the channel 46 prior to initial rotation of the bit no more than one revolution of the bit will occur before the conductor encounters the shelf 40 and the edge 52 again cuts into the conductor insulation. Accordingly, no more than one complete turn or wrap around a terminal would be required to train the conductor onto the shelf and before cutting of the insulation is commenced.

If the insulation cutting edge 52 should become dulled from repeated use it may be easily resharpened by grinding the surface of the projection 50 which faces away from the bit end face 30. The edge 52 may be sharpened a number of times without detrimental effect to the location of the longitudinal cut in the conductor insulation cover and without effecting the shape or location of the guide channel 46 or the other surfaces upon which the conductor is guided during the cutting and wrapping operation. Thanks to the arrangement of the shelf 40 and the projection 50 the above noted advantages as well as others will be apparent to those skilled in the art of conductor wrapping bits. Moreover, the bit 14 may be used in a conventional conductor wrapping operation wherein the conductor is inserted into the groove 28 from the end face instead of through the tool 10 as shown in FIG. 1. Modifications to the bit end face 30 may also be made to provide surfaces for camming the conductor onto the terminal in a radial inward direction.

The bit 14 is preferably made of a suitable hardenable steel and may be used to wrap metal conductor wire having plastic, rubber, paper, or other flexible insulation covering. In a preferred embodiment of the bit 14 for wrapping 26 gage conductor wire (American Wire Gage) with a plastic insulation cover having a thickness of 0.14 mm the radius R is 1.35 mm, and the pitch of the helix of the surface 62 is 1.13 mm, both dimensions nominal.

What is claimed is:

1. A bit rotatable about a longitudinal axis for wrapping a flexible insulated conductor wire about a terminal in a series of helical convolutions comprising:

an end face;

a terminal receiving bore in said end face;

a longitudinal conductor wire receiving groove in said bit and opening at one end to said end face;

means forming a surface extending substantially transversely with respect to said axis across the opening of said groove to said end face for guiding and supporting said conductor wire after it is withdrawn from said groove; and, means forming a cutting edge disposed along said surface and extending in a substantially transverse direction with respect to said axis for continuously slitting the insulation of said conductor wire in a substantially longitudinal direction with respect to said conductor wire after said conductor wire is withdrawn from said groove and before said conductor wire is wrapped on a terminal.

2. The invention set forth in claim 1 wherein:

said cutting edge is formed on a projection extending from said surface.

3. The invention set forth in claim 2 wherein:

said surface includes a curved portion for supporting said conductor wire and said projection includes a portion which extends from said curved portion of said surface.

4. The invention set forth in claim 2 together with:

a step formed in said surface between said projection and said end face for supporting and guiding said conductor wire along said cutting edge.

5. The invention set forth in claim 4 wherein:

said bit includes a conductor guide channel intersecting said groove and said end face, said guide channel being formed to extend in a curved path along at least a major portion of its length between said groove and said end face, said curved path being of a circular radius of curvature and which lies in a plane bisecting said guide channel and parallel to said surface.

6. The invention set forth in claim 5 wherein: said end face includes a planar surface which is perpendicular to said axis and a surface which slopingly intersects said planar surface and said guide channel.

7. The invention set forth in claim 6 together with: a substantially transverse annular surface on said bit disposed around said terminal receiving bore and having a helical lead corresponding substantially to the helical lead of a conductor wire convolution.

8. The invention set forth in claim 7 wherein:

said annular surface terminates at one end at said planar surface and at its opposite end at a second transverse surface forming a relief for said means forming said surface extending substantially transversely with respect to said axis.

* * * * *